United States Patent
Paul et al.

(10) Patent No.: US 10,776,429 B2
(45) Date of Patent: Sep. 15, 2020

(54) OPTIMIZING MEMORY USAGE FOR A HYPERLOGLOG ESTIMATOR

(71) Applicant: Microsoft Technology Licensing, LLC, Redmond, WA (US)

(72) Inventors: Parag Nandan Paul, Redmond, WA (US); Edgars Sedols, Redmond, WA (US); Sudin Bhat, Redmond, WA (US); Gjorgji Gjeorgjievski, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 233 days.

(21) Appl. No.: 15/952,036

(22) Filed: Apr. 12, 2018

(65) Prior Publication Data

US 2019/0318042 A1    Oct. 17, 2019

(51) Int. Cl.
*G06F 7/00* (2006.01)
*G06F 16/903* (2019.01)
*G06F 17/18* (2006.01)
*G06F 16/901* (2019.01)
*G06F 16/9038* (2019.01)

(52) U.S. Cl.
CPC ...... *G06F 16/90348* (2019.01); *G06F 16/901* (2019.01); *G06F 16/9038* (2019.01); *G06F 17/18* (2013.01)

(58) Field of Classification Search
CPC ............. G06F 16/90348; G06F 16/901; G06F 16/9038; G06F 17/18

USPC .................................................. 707/600–899
See application file for complete search history.

(56) References Cited

U.S. PATENT DOCUMENTS

2015/0269178 A1 *  9/2015  Rhodes ................. G06F 16/958
                                                          707/700

OTHER PUBLICATIONS

Jimenez, Sergio, "File:Zipf 30wiki en labels.png", Retrieved From https://en.wikipedia.org/wiki/File:Zipf_30wiki_en_labels.png, Dec. 8, 2015, 2 Pages.
Heule, et al., "HyperLogLog in Practice: Algorithmic Engineering of a State of the Art Cardinality Estimation Algorithm", In Proceedings of the 16th International Conference on Extending Database Technology, Mar. 18, 2013, 10 Pages.

* cited by examiner

*Primary Examiner* — Isaac M Woo
(74) *Attorney, Agent, or Firm* — Ray Quinney & Nebeker, P.C.; Thomas M. Hardman; Timothy J. Churna

(57) ABSTRACT

A method for optimizing memory usage for a hyperloglog (HLL) estimator is disclosed. When a multiset is applied to an HLL estimator, a sparse representation of a sketch may be created. The sparse representation may be sorted whenever a total number of buckets in the sparse representation is evenly divisible by a sorting threshold and is also less than a transition threshold. The sparse representation may be converted to a dense representation when the number of buckets in the sparse representation reaches the transition threshold.

20 Claims, 9 Drawing Sheets

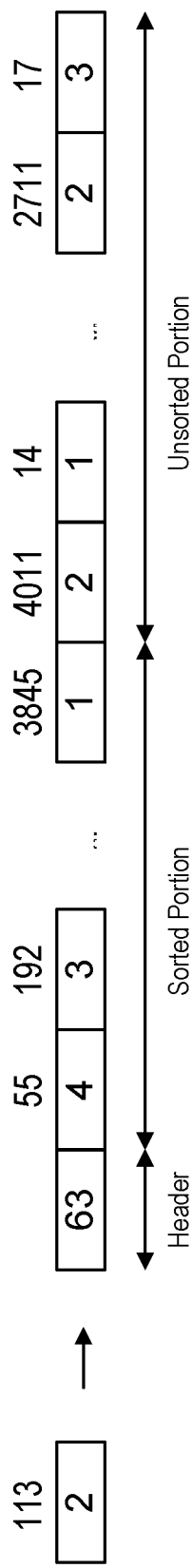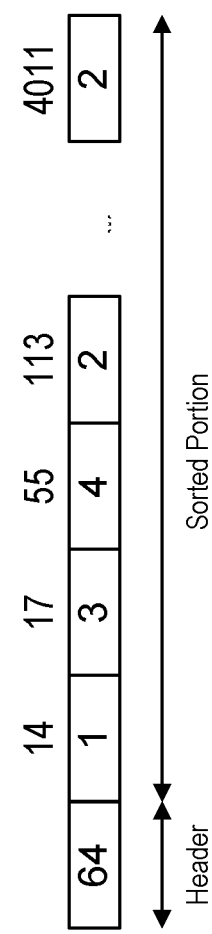
FIG. 2G
FIG. 2H

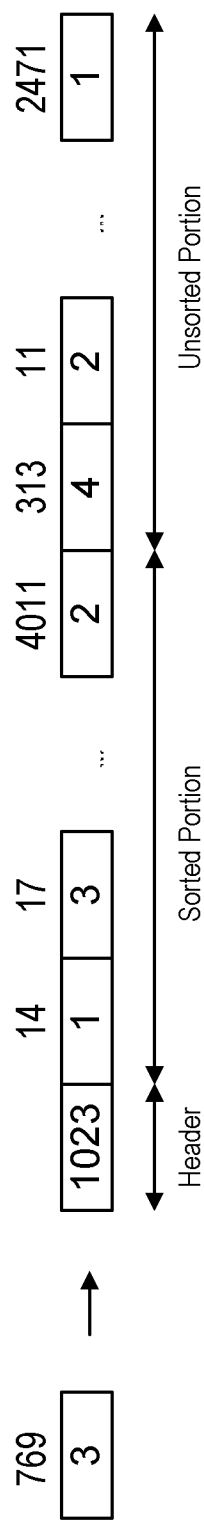

OPTIMIZING MEMORY USAGE FOR A HYPERLOGLOG ESTIMATOR

CROSS-REFERENCE TO RELATED APPLICATIONS

N/A

BACKGROUND

A multiset is a set of data that allows for repeated elements. For example, many of the records within a database may be duplicates of one another. Thus, while a database may include a large number of elements, it may be the case that only a subset of those elements are unique.

The cardinality of a multiset is the number of distinct elements within the multiset. HyperLogLog (HLL) is an algorithm that estimates the cardinality of a multiset. Calculating the exact cardinality of a multiset may take a significant amount of time and may require a large amount of memory, particularly for large multisets. Probabilistic cardinality estimators, such as an HLL estimator, are significantly faster and require much less memory, at the cost of obtaining only an approximation of the cardinality. The approximation, however, is generally fairly accurate.

HLL estimators work well with multisets that contain very large numbers of values. For example, an HLL estimator may be used to estimate the number of searches that end users perform on an Internet search engine within a day. Trying to pull all of the searches into memory to work with them would be virtually impossible because of the amount of memory required and the amount of time it would take. An HLL estimator converts the data into a hash of random numbers representing the cardinality of the data supplied.

The basis of an HLL estimator is the observation that the cardinality of a multiset of uniformly distributed random numbers can be estimated by calculating the maximum number of leading zeros in the binary representation of each number in the set. If the maximum number of leading zeros observed is n, an estimate for the number of distinct elements in the set is $2^n$.

To improve overall accuracy, the multiset can be split into numerous subsets. An estimate of the cardinality for each subset may be determined, and the cardinality of the whole multiset may be estimated by determining the harmonic mean of all of the estimates.

BRIEF DESCRIPTION OF THE DRAWINGS

FIGS. 2A-2J illustrate an example showing how an HLL estimator may be configured to operate in accordance with the present disclosure.

DETAILED DESCRIPTION

Figure 1A:
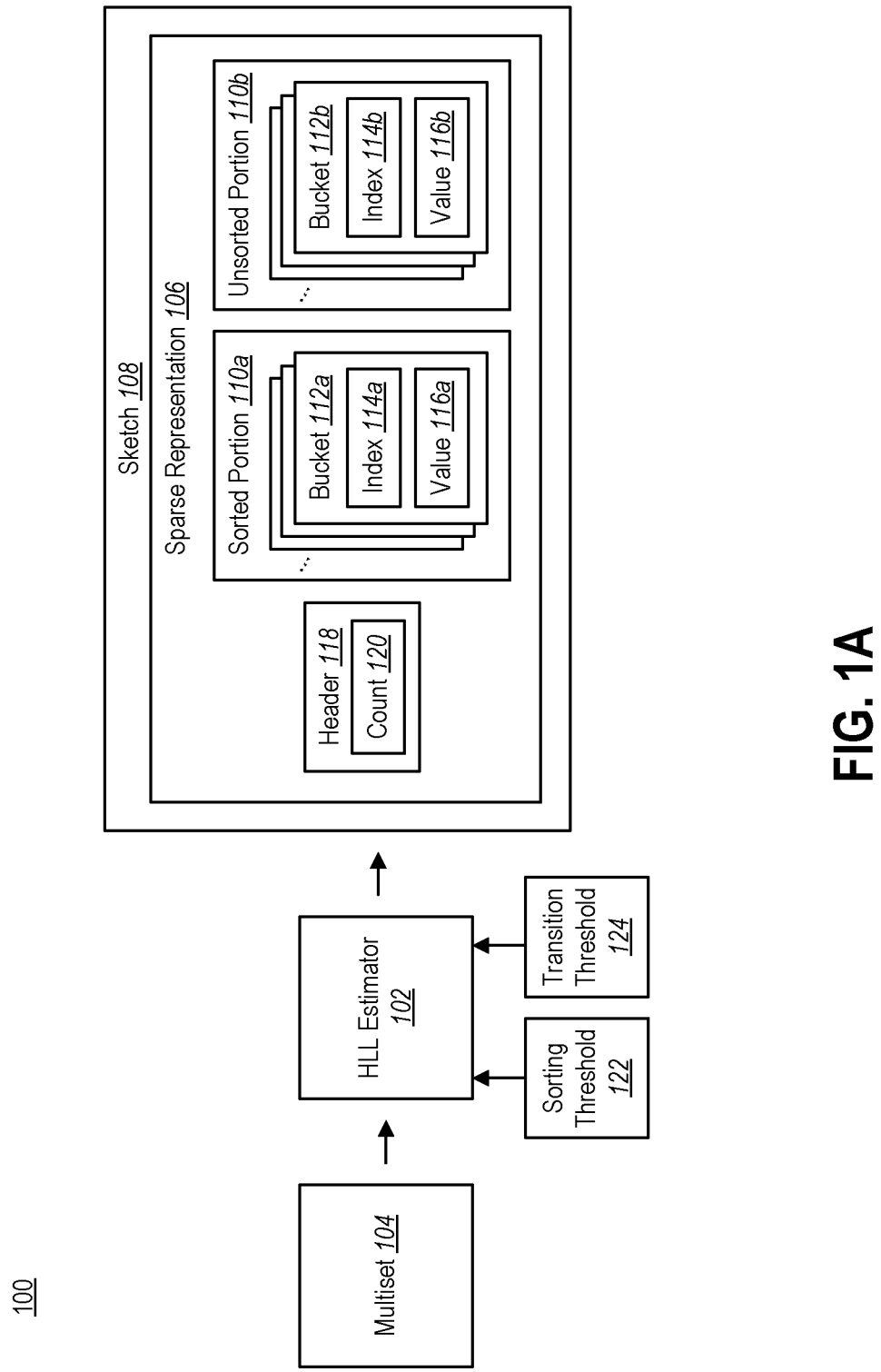
FIGS. 1A-1B illustrate an example of a system for optimizing memory usage for an HLL estimator.

When a multiset is applied to an HLL estimator, a sketch may be created. The term "sketch" refers to the representation of certain information that is generated at intermediate stages of the HLL algorithm. As indicated above, in order to improve the accuracy of an HLL estimator, a multiset can be split into numerous subsets. A sketch includes buckets that correspond to these subsets. The term "bucket" refers to a particular buffer of memory.

An HLL estimator applies a hash function to the elements in the multiset. This results in multiple hash values being created, a separate hash value for each unique element bound to the domain of the hashed value in the multiset. Each hash value is mapped to a particular bucket. A bucket includes an index and a value. The first x bits (e.g., 12 bits) of the hash value may determine the index of the bucket to which the hash value is mapped, and the last y bits (e.g., 52 bits) of the hash value may determine the value that is stored in the bucket. The index of a bucket may be referred to herein as a bucket index.

A sketch may be represented densely or sparsely. For a dense representation of a sketch, a certain number of buckets are pre-defined for the sketch. The number of buckets is typically some power of two (e.g., $2^{12}$=4096 buckets). For a sparse representation of a sketch, buckets are created as they are needed. Thus, a dense representation of a sketch may include a number of buckets that have no values stored in them. In contrast, all of the buckets in a sparse representation of a sketch include non-zero values stored in them. If a value of n is stored in a bucket, this means that there are n leading zeroes in the last y bits of the corresponding hash value.

Using a dense representation of a sketch can be inefficient when the number of buckets that are pre-defined for the sketch significantly exceeds the number of distinct elements in the multiset. In this case, memory may be allocated for a large number of buckets that store no values.

It can also be inefficient to use a dense representation of a sketch for queries that are non-scalar and that include a group by clause, where some or most of the groups have very few inputs. In the context of an SQL query, a group by clause may be used to collect data across multiple records and group the results by one or more columns. For example, consider a query that attempts to find the number of distinct user identifiers (IDs) in a table of devices, and that groups the results by the type of device. The groups for non-popular devices may include very few distinct user IDs. Each of those groups, however, would still end up using a complete sketch.

In cases such as the ones discussed above, it can be beneficial to use a sparse representation of a sketch. This, however, presents its own set of challenges, particularly with respect to insertion logic. For example, each time a new element from the multiset is read, it is possible that all of the buckets in the sparse representation would need to be accessed in order to determine whether a new bucket should be created. One way to mitigate this problem would be to maintain the sparse representation of the sketch as a sorted list at all times. This, however, would lead to additional computational complexity and overhead.

The present disclosure is generally related to optimizing memory usage for an HLL estimator. In accordance with the present disclosure, when a multiset is applied to an HLL estimator, a sparse representation of a sketch may initially be created. The sparse representation may include a sorted portion and an unsorted portion. Both the sorted portion and the unsorted portion may include one or more buckets. Each bucket may include an index and a value. The buckets in the sorted portion may be arranged in the order of their respective bucket indices. The buckets in the unsorted portion may not be arranged in any particular order.

Two thresholds may be defined for the sparse representation: a sorting threshold and a transition threshold. New buckets may be added to the unsorted portion until the number of buckets in the sketch is evenly divisible by the sorting threshold. When this happens, the sparse representation may either be sorted (if the number of buckets in the sketch is less than the transition threshold) or converted (or transformed) to a dense representation (if the number of buckets in the sketch equals the transition threshold).

For example, suppose that the sorting threshold is 16 and the transition threshold is 1024. In this example, the sparse representation may be sorted whenever the number of buckets reaches a multiple of 16 (e.g., 16, 32, 48, 64, . . . ) until the number of buckets equals 1024, at which point the sparse representation may be converted (or transformed) to the dense representation. By periodically sorting the sparse representation in this way, the sorting costs may be distributed over time. In other words, the number of items that need to be sorted at any given point in time may be less than or equal to the sorting threshold. Thus, even if the number of buckets in the sparse representation greatly exceeds the sorting threshold at a particular point in time (e.g., a total of 517 buckets), most of the buckets may already be sorted (e.g., 512 sorted buckets and 5 unsorted buckets, assuming a sorting threshold of 16).

To optimize the insertion logic, the sorted portion may include a header that includes a count of the total number of buckets that are currently stored in the sparse representation. When a new element is read from the multiset that is being evaluated, the count of the number of currently stored buckets can be used to determine whether or not it is necessary to search the buckets in the sorted portion in order to update the sparse representation based on the new element. If the bucket index of the new element is outside the range of bucket indices corresponding to the sorted portion, then it is not necessary to search the buckets in the sorted portion.

Thus, the present disclosure provides an optimized sparse representation that has low insertion costs and distributes the sorting costs over time. The optimized sparse representation is also adaptive and can switch to a dense representation when a certain size is reached.

Figure 1B:
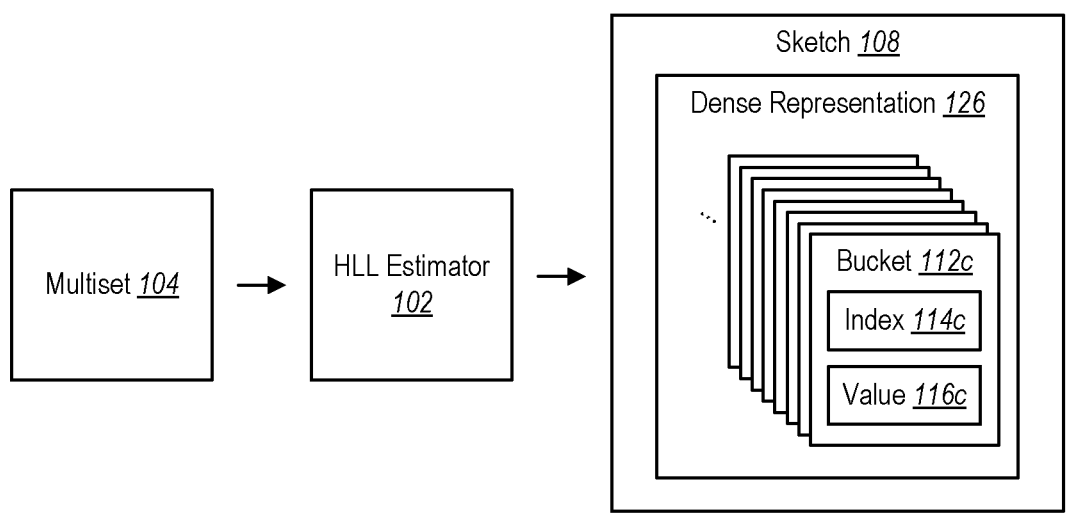

FIGS. 1A-B illustrate an example of a system 100 for optimizing memory usage for an HLL estimator 102 in accordance with the present disclosure. Reference is initially made to the portion of the system 100 that is shown in FIG. 1A.

When a multiset 104 is applied to an HLL estimator 102, a sparse representation 106 of a sketch 108 may initially be created. The sparse representation 106 may include a sorted portion 110a and an unsorted portion 110b. The sorted portion 110a may include one or more buckets 112a. Each bucket 112a in the sorted portion 110a may include an index 114a and a value 116a. Similarly, the unsorted portion 110b may include one or more buckets 112b. Each bucket 112b in the unsorted portion 110b may include an index 114b and a value 116b. All of the buckets 112a-b in the sparse representation 106 may include non-zero values 116a-b.

Each of the buckets 112a-b in the sparse representation 106 may correspond to a particular buffer of memory. In some implementations, each of the buckets 112a-b may correspond to a particular physical allocation of memory.

The sparse representation 106 may also include a header 118. The header 118 may include a count 120 of the total number of buckets 112a-b stored in the sparse representation 106.

At least two thresholds may be defined for the HLL estimator 102: a sorting threshold 122 and a transition threshold 124. The sorting threshold 122 may indicate how frequently the sparse representation 106 is sorted. The transition threshold 124 may indicate when the sparse representation 106 is converted (or transformed) to a dense representation 126 (which is shown in FIG. 1B).

More specifically, the HLL estimator 102 may be configured so that the sparse representation 106 is sorted whenever the total number of buckets 112a-b stored in the sparse representation 106 (including the buckets 112a in the sorted portion 110a and the buckets 112b in the unsorted portion 110b) is evenly divisible by the sorting threshold 122 and is also less than the transition threshold 124. The HLL estimator 102 may also be configured so that the sparse representation 106 is converted to the dense representation 126 when the total number of buckets 112a-b stored in the sparse representation 106 reaches the transition threshold 124. A specific example which shows how the sorting threshold 122 and the transition threshold 124 may be used will be described below in connection with FIGS. 2A-J.

Reference is now made to FIG. 1B, which shows the sketch 108 after it has been converted from the sparse representation 106 to a dense representation 126. The dense representation 126 of the sketch 108 may include multiple buckets 112c. Each bucket 112c in the dense representation 126 may include an index 114c and a value 116c. Some of the buckets 112c in the dense representation 126 include non-zero values 116c. At the same time, however, the value 116c of some (and possibly most) of the buckets 112c in the dense representation 126 may have no values stored in them.

FIGS. 2A-J illustrate an example showing how an HLL estimator may be configured to operate in accordance with the present disclosure. The example involves the use of numeric values. Therefore, for the sake of clarity, the example will be described without the use of reference numbers.

Figure 2A:
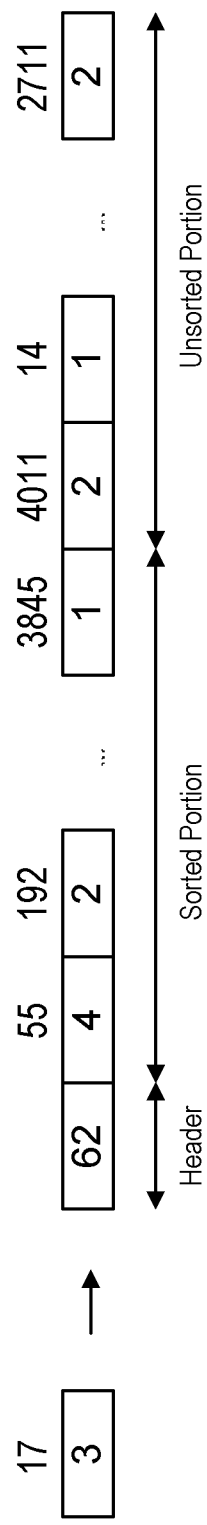

Reference is initially made to FIG. 2A, which illustrates a sparse representation of a sketch at a particular point in time that will be referred to as $t_1$. The sparse representation includes a sorted portion, an unsorted portion, and a header. Both the sorted portion and the unsorted portion include multiple buckets. Each bucket includes an index and a value. The index is shown above the value that is stored in a particular bucket. For example, the first bucket in the sorted portion has an index of 55 and a value of 4, and the index (55) is shown above the value (4).

The buckets in the sorted portion are arranged in the order of their respective bucket indices. The buckets in the unsorted portion, however, are not arranged in any particular order.

The sparse representation also includes a header, which includes a count of the total number of buckets stored in the sparse representation. In this example, it will be assumed that at time $t_1$ the sparse representation includes a total of 62 buckets, including the buckets in both the sorted portion and the unsorted portion.

A new element may be read from the multiset that is being evaluated, and a hash value for the new element may be determined. In this example, it will be assumed that when the hash value is mapped to a bucket of the sparse representation, the index of the bucket is 17 and the value of the bucket is 3.

In response to determining the bucket index and the value for the new element, the sparse representation may be updated. The HLL estimator may determine whether the bucket index for the new element already exists in the sparse representation. To make this determination, the HLL estimator may initially evaluate the sorted portion. It may, however, not be necessary to search each bucket within the sorted portion. The HLL estimator may identify the range of bucket indices in the sorted portion. For example, the HLL estimator may identify the lowest bucket index and the highest bucket index in the sorted portion. If the bucket index for the new element is outside of the range of bucket indices in the sorted portion (e.g., lower than the lowest bucket index or higher than the highest bucket index), then it is not necessary for the HLL estimator to do any additional searching within the sorted portion.

In this example, the HLL estimator may compare the bucket index for the new element (which is 17) with the index of the first bucket in the sorted portion (which is 55). Because 17<55, the HLL estimator may conclude that the bucket index for the new element does not exist in the sorted portion.

The HLL estimator may then search the unsorted portion to see if it includes a bucket with an index of 17. In some implementations, the sparse representation may have a compact format in which the header, the buckets in the sorted portion, and the buckets in the unsorted portion occupy contiguous memory locations. In such implementations, in order to locate the beginning of the unsorted portion, the HLL estimator may determine the number of times that the sparse representation has been sorted. This may be determined by dividing the count in the header by the sorting threshold. In this example, the result of this calculation is 62/16=3 with a remainder of 14, which means that the sparse representation has been sorted 3 times. To determine where the unsorted portion begins, the HLL estimator may multiply the sorting threshold by the number of times that the sparse representation has been sorted and the number of bits in each bucket (the sparse representation may be configured so that each bucket has the same size), and then add 1. In this example, if each bucket includes 18 bits, the calculation would be 16×3×18+1=865. Thus, in this example, the location of the first bucket of the unsorted portion would be the 865th bit after the end of the header.

Figure 2B:
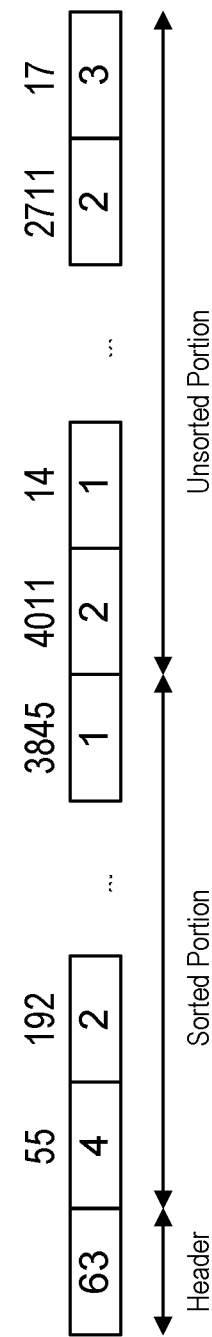

Once the HLL estimator determines the start of the unsorted portion, the HLL estimator may search the buckets in the unsorted portion to see if any of them have an index equal to the bucket index for the new element (which is 17). In this example, it will be assumed that none of the buckets in the unsorted portion have an index of 17. Thus, after searching the unsorted portion, the HLL estimator may add a new bucket for the new element at the end of the unsorted portion, as shown in FIG. 2B. In this example, the new bucket includes an index of 17 and a value of 3. After the new bucket has been added, the count in the header may be updated (to 63 in this example).

Figure 2C:
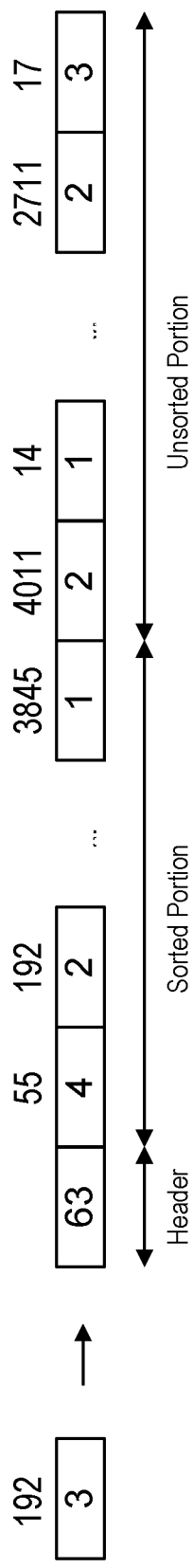

Reference is now made to FIG. 2C, which illustrates the sparse representation at a subsequent point in time that will be referred to as $t_2$, where $t_2$ occurs after $t_1$. Another new element may be read from the multiset that is being evaluated, and a hash value for the new element may be determined. In this example, it will be assumed that when the hash value is mapped to a bucket of the sparse representation, the index of the bucket is 192 and the value of the bucket is 3.

The HLL estimator may determine whether the bucket index for the new element already exists in the sparse representation. As indicated above, the HLL estimator may initially evaluate the sorted portion. In this case, because the bucket index for the new element (which is 192) exceeds the index of the first bucket in the sorted portion (which is 55), the HLL estimator may proceed to identify the highest bucket index in the sorted portion. Because the highest bucket index in the sorted portion corresponds to the last bucket in the sorted portion, the HLL estimator may determine the location of the last bucket in the sorted portion. This may be determined in a manner similar to determining the location of the first bucket in the unsorted portion, as discussed above. In this case, however, the calculation may involve multiplying the sorting threshold by the number of times that the sparse representation has been sorted and the number of bits in each bucket, and then subtracting the number of bits in a single bucket: 16×3×18−18=846. Thus, in this example, the location of the last bucket of the sorted portion begins at the 846th bit after the end of the header.

Once the HLL estimator determines the location of the last bucket in the sorted portion, the HLL estimator may determine the index of that bucket, which is 3845 in this example. Because the bucket index for the new element (which is 192) is less than the index of the last bucket in the sorted portion (which is 3845), it is possible that the bucket index for the new element exists in the sorted portion. Thus, the HLL estimator may proceed to search the buckets in the sorted portion.

Figure 2D:
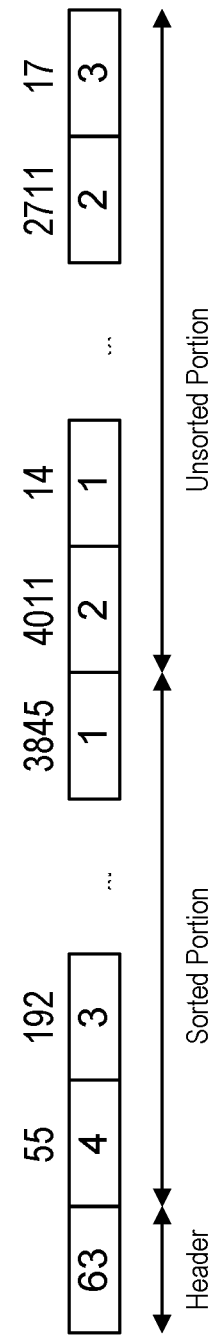

In this example, the second bucket in the sorted portion has an index that matches the bucket index for the new element. In response to determining this, the HLL estimator may compare the value of the second bucket in the sorted portion with the value of the new element. Since the value of the new element (which is 3) exceeds the value of the second bucket in the sorted portion (which is 2), the value of the second bucket in the sorted portion may be updated to include the higher value. This is shown in FIG. 2D.

Figure 2E:
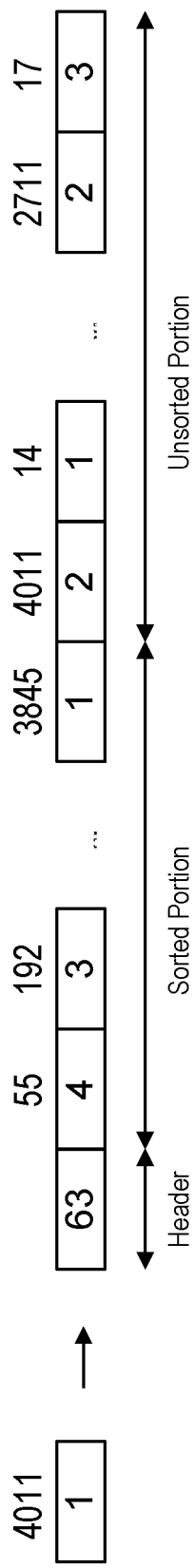

Reference is now made to FIG. 2E, which illustrates the sparse representation at a subsequent point in time that will be referred to as $t_3$, where $t_3$ occurs after $t_2$. For purposes of the present example it will be assumed that at time $t_3$ another new element is read from the multiset that is being evaluated, and that a hash value for the new element is determined. It will also be assumed that when the hash value is mapped to a bucket of the sparse representation, the index of the bucket is 4011 and the value of the bucket is 1.

Figure 2F:
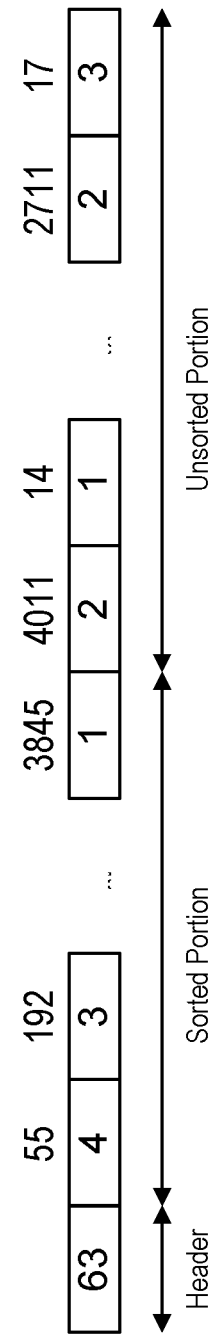

The HLL estimator may determine that the bucket index for the new element does not exist in the sorted portion because the bucket index for the new element (which is 4011) is greater than the highest bucket index in the sorted portion (which is 3845). The HLL estimator may then proceed to search the unsorted portion to see if it includes a bucket with an index of 4011. In this example, the index of the first bucket in the unsorted portion is 4011. Thus, in this example, the HLL estimator may compare the value of the first bucket in the unsorted portion with the value of the new element. Since the value of the new element (which is 1) is less than the value of the first bucket in the unsorted portion (which is 2), the HLL estimator may simply discard the new element without making any changes to the sparse representation. In other words, as shown in FIG. 2F, the value of the first bucket in the unsorted portion may remain as 2.

Although in the depicted example the bucket index for the new element matches the index of the first bucket in the unsorted portion, this should not be interpreted as limiting the scope of the present disclosure. The bucket index for the new element may match the index of a different bucket in the unsorted portion. When the HLL estimator finds a bucket whose index matches the bucket index of the new element, the HLL estimator may compare the value of that bucket with the value of the new element. Alternatively, the bucket index for the new element may not match the index of any of the buckets in the sorted portion or the unsorted portion (at which point a new bucket may be created, as discussed above).

Reference is now made to FIG. 2G, which illustrates the sparse representation at a subsequent point in time that will be referred to as $t_4$, where $t_4$ occurs after $t_3$. For purposes of the present example it will be assumed that at time $t_4$ another new element is read from the multiset that is being evaluated, and that when a hash value for the new element is mapped to a bucket of the sparse representation, the index of the bucket is 113 and the value of the bucket is 2. It will also be assumed that none of the buckets in the sorted portion or the unsorted portion have an index of 113. Thus, a new bucket is created for the sparse representation.

When the new bucket is created, this increases the total count for the sparse representation from 63 buckets to 64 buckets, which is divisible by the sorting threshold (which is 16 in this example). Because the total count for the sparse representation is divisible by the sorting threshold but is less than the transition threshold, the sparse representation may be sorted.

FIG. 2H shows the sparse representation after it has been sorted. The count in the header has been updated to reflect the fact that the sparse representation now includes a total of 64 buckets. All of these buckets are in the sorted portion. At this point in time, there are not any buckets in the unsorted representation.

Reference is now made to FIG. 2I, which illustrates the sparse representation at a subsequent point in time that will be referred to as $t_5$, where $t_5$ occurs after $t_4$. For purposes of the present example it will be assumed that time $t_5$ occurs well after time $t_4$, and that quite a few new buckets have been added to the sparse representation since time $t_4$. In particular, the sparse representation now includes a total of 1023 buckets, which is reflected in the count in the header. It will also be assumed that at time $t_5$ another new element is read from the multiset that is being evaluated, and that when a hash value for the new element is mapped to a bucket of the sparse representation, the index of the bucket is 769 and the value of the bucket is 3.

When the new bucket is created, this increases the total count for the sparse representation from 1023 buckets to 1024 buckets, which is equal to the transition threshold in this example. (The transition threshold may, of course, be a different value, but 1024 is used in this example.) Because the total count for the sparse representation is equal to the transition threshold, the sparse representation is converted to the dense representation, which is shown in FIG. 2J. The dense representation includes a pre-defined number of buckets (4096 in this example). Many of these buckets include no values stored in them. The buckets that have no values in them are represented with zeroes in FIG. 2J.

The specific numerical values that were discussed in connection with FIGS. 2A-J were provided for purposes of example only and should not be interpreted as limiting the scope of the present disclosure. For example, the sorting threshold may be a value other than 16 buckets, the transition threshold may be something other than 1024 buckets, the size of the dense representation may be something other than 4096 buckets, and so forth. Those skilled in the art will recognize that numerical values that are different from the ones discussed above may be used in accordance with the present disclosure.

In the example of FIGS. 2A-J, it was assumed that each bucket within the sparse representation is represented using 18 bits, which is a relatively small size compared to the sizes that are used in other known approaches. One technique that makes it possible for an HLL estimator to use a relatively small number of bits to represent each bucket within the sparse representation is described in U.S. patent application Ser. No. 15/860,474, titled "Low Cardinality Bias Correction System," which is assigned to the owner of the present application. This co-pending application describes a technique for bias correction when an HLL estimator is used on a set of values in a multiset that includes a "small" set of distinct values, where "small" refers to a number of distinct values that has a statistically significant (according to some predetermined criteria) overestimation bias for a given HLL estimator.

Using 18 (or fewer) bits to represent each bucket in the sparse representation may be advantageous because it can allow the transition threshold to be higher than it otherwise would be if more bits were used to represent each bucket. In some implementations, the transition threshold may be set such that it represents the point at which the size of the sparse representation starts to exceed the size of the dense representation. The smaller each bucket is in the sparse representation, the more buckets it takes to reach that point (i.e., the higher the transition threshold can be).

However, it is not necessary to use 18 or fewer bits as the bucket size. The optimization techniques described herein may be utilized even if buckets are represented using more than 18 bits.

Figure 3:
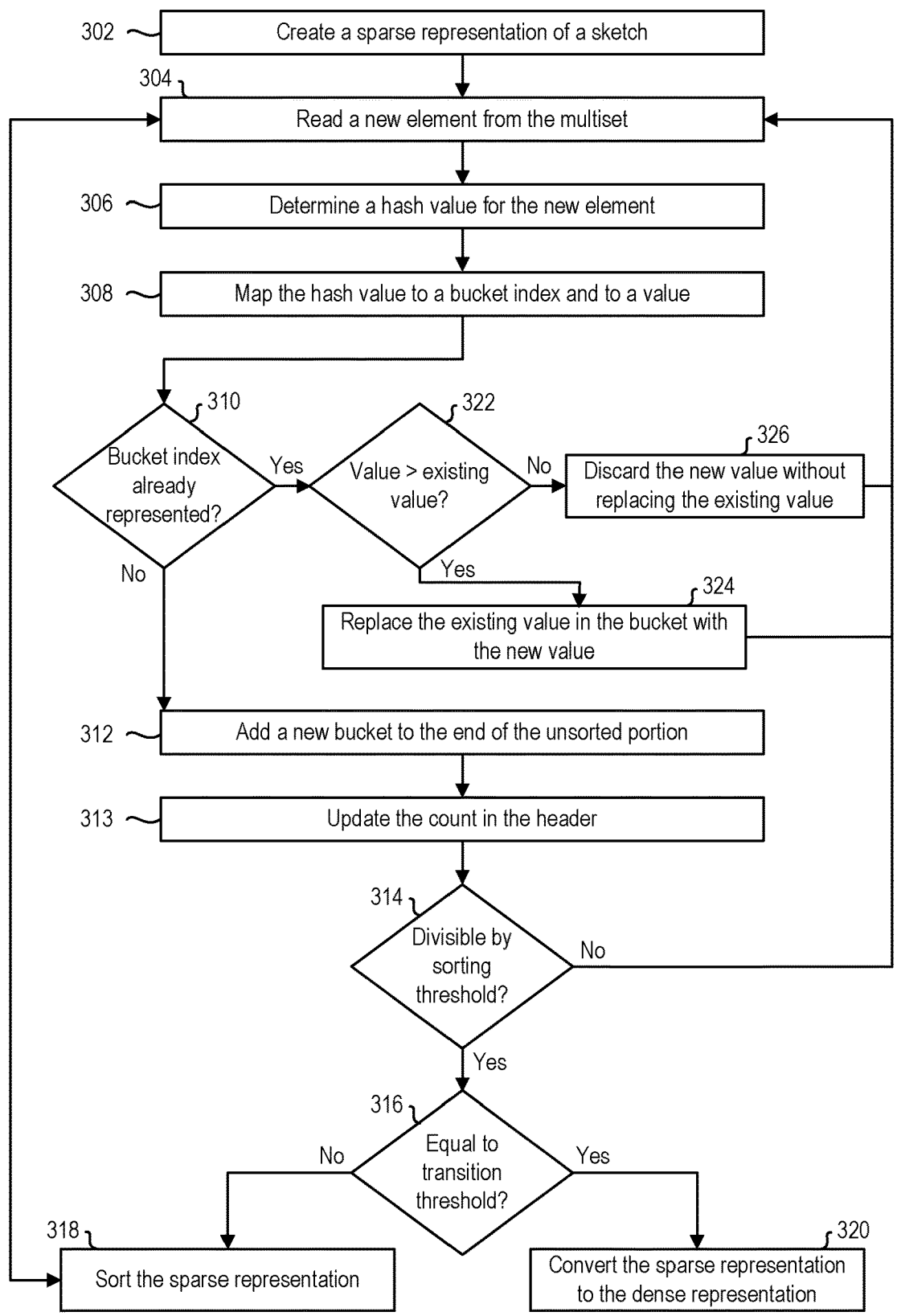
FIG. 3 illustrates an example of a method for optimizing memory usage for an HLL estimator in accordance with the present disclosure.

FIG. 3 illustrates an example of a method 300 for optimizing memory usage for an HLL estimator 102 in accordance with the present disclosure. The method 300 will be described in relation to the system 100 shown in FIGS. 1A-B.

As discussed above, the method 300 includes applying a multiset 104 to an HLL estimator 102 and creating 302 a sparse representation of a sketch 108. A new element may be read 304 from the multiset 104, and a hash value for the new element may be determined 306. The hash value may be mapped 308 to a bucket index and to a value. For example, as indicated above, the first x bits (e.g., 12 bits) of the hash value may determine the bucket index, and the last y bits (e.g., 52 bits) of the hash value may determine the value.

The HLL estimator 102 may determine 310 whether the bucket index corresponding to the new element is already represented in the sparse representation 106 of the sketch 108. As discussed above, it may not be necessary for the HLL estimator 102 to search each bucket 112a within the sorted portion 110a to make this determination. For example, as discussed above in connection with FIGS. 2A-B, the HLL estimator 102 may determine, from the header 118, that the bucket index corresponding to the new element is outside of the range of bucket indices 114a corresponding to the sorted portion 110a. In response to making this determination, the HLL estimator 102 may search for the bucket index in the unsorted portion 110b without additional searching in the sorted portion 110a.

Alternatively, if the bucket index corresponding to the new element is within the range of bucket indices 114a corresponding to the sorted portion 110a, the HLL estimator 102 may search the buckets 112a within the sorted portion 110a as well as the buckets 112b within the unsorted portion 110b in order to determine 310 whether the bucket index corresponding to the new element is already represented in the sparse representation 106.

If the HLL estimator 102 determines 310 that the bucket index of the new element is not already represented in the sparse representation 106 of the sketch 108, then a new bucket may be added 312 to the end of the unsorted portion 110b of the sparse representation 106. An example of this was discussed above in connection with FIGS. 2A-B. The count 120 in the header 118 may be updated 313 to reflect the additional bucket that has been added 312.

The HLL estimator 102 may then determine 314 whether the total number of buckets 112a-b in the sparse representation 106 is divisible by the sorting threshold 122. If it is, then the HLL estimator 102 may also determine 316 whether the total number of buckets 112a-b in the sparse representation 106 is equal to the transition threshold 124.

If the HLL estimator 102 determines 314 that the total number of buckets 112a-b in the sparse representation 106 is divisible by the sorting threshold 122 but also determines 316 that the total number of buckets 112a-b in the sparse representation 106 is not equal to the transition threshold 124, the HLL estimator 102 may sort 318 the sparse representation 106. An example of this was discussed above in connection with FIGS. 2G-H. The method 300 may then return to the operation of reading 304 a new element from the multiset 104 and proceed as described above.

If, however, the HLL estimator 102 determines 314 that the total number of buckets 112a-b in the sparse representation 106 is divisible by the sorting threshold 122 and also determines 316 that the total number of buckets 112a-b in the sparse representation 106 is equal to the transition threshold 124, the HLL estimator 102 may convert 320 the sparse representation 106 of the sketch 108 to the dense representation 126. An example of this was discussed above in connection with FIGS. 2I-J.

If the HLL estimator 102 determines 314 that the total number of buckets 112a-b in the sparse representation 106 is not divisible by the sorting threshold 122, the method 300 may then return to the operation of reading 304 a new element from the multiset 104 and proceed as described above.

If the HLL estimator 102 determines 310 that the bucket index of the hash value corresponding to the newly read element is already represented in the sparse representation 106 of the sketch 108, then the HLL estimator 102 may determine 322 whether the value is greater than the existing value that is stored in the corresponding bucket. If it is, then the HLL estimator 102 may replace 324 the existing value in the bucket with the current value. An example of this was discussed above in connection with FIGS. 2C-D. If, however, the HLL estimator 102 determines 322 that the value is less than or equal to the existing value that is stored in the corresponding bucket, the HLL estimator 102 may discard 326 the new value without replacing the existing value. An example of this was discussed above in connection with FIGS. 2E-F. The method 300 may then return to the operation of reading 304 a new element from the multiset 104 and proceed as described above.

The method 300 may be performed by a computer system as part of performing the HLL algorithm. The computer system may perform the HLL algorithm in response to receiving a query that requests an identification of the number of distinct elements in a multiset. The query may be received via user input. In order to optimize memory usage while performing the HLL algorithm, the computer system may perform some or all of the memory optimization techniques disclosed herein, including some or all of the method 300 shown in FIG. 3. Once the computer system finishes performing the HLL algorithm, the computer system may output an estimate of the number of distinct elements in the multiset.

Figure 4:
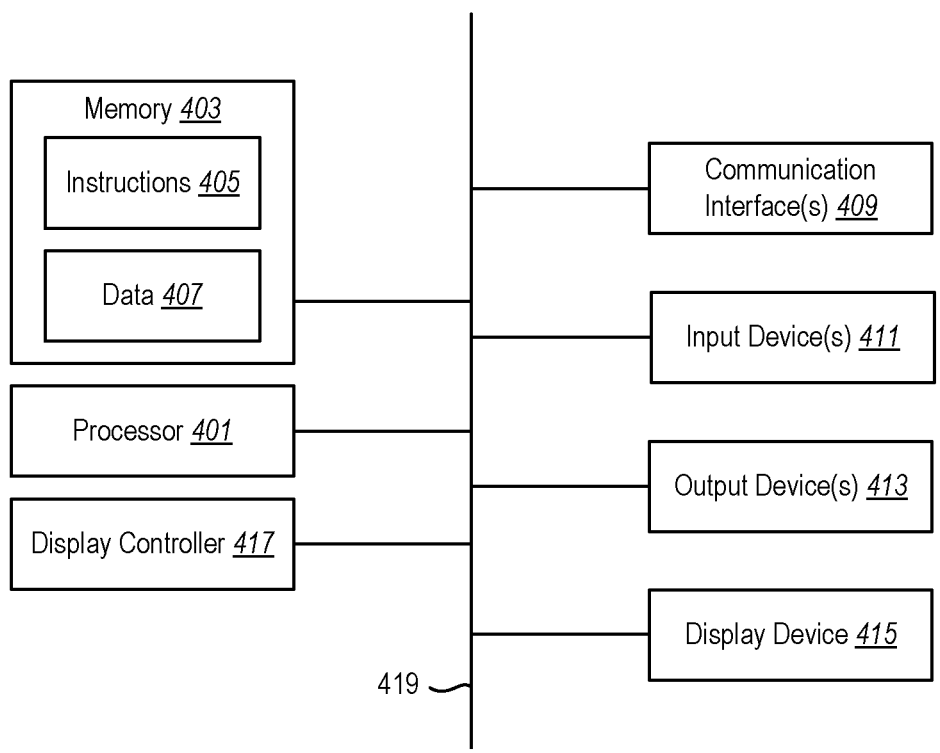
FIG. 4 illustrates certain components that may be included within a computer system.

FIG. 4 illustrates certain components that may be included within a computer system 400. One or more computer systems 400 may be used to implement a system 100 for optimizing memory usage for an HLL estimator 102 in accordance with the present disclosure.

The computer system 400 includes a processor 401. The processor 401 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 401 may be referred to as a central processing unit (CPU). Although just a single processor 401 is shown in the computer system 400 of FIG. 4, in an alternative configuration, a combination of processors (e.g., an ARM and DSP) could be used.

The computer system 400 also includes memory 403. The memory 403 may be any electronic component capable of storing electronic information. For example, the memory 403 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof. Certain portions of the memory 403 may be allocated as buffers corresponding to the buckets described herein.

Instructions 405 and data 407 may be stored in the memory 403. The instructions 405 may be executable by the processor 401 to implement some or all of the methods disclosed herein, such as the method 300 shown in FIG. 3. Executing the instructions 405 may involve the use of the data 407 that is stored in the memory 403. Any of the various examples of modules and components described herein may be implemented, partially or wholly, as instructions 405 stored in memory 403 and executed by the processor 401. Any of the various examples of data described herein may be among the data 407 that is stored in memory 403 and used during execution of the instructions 405 by the processor 401.

A computer system 400 may also include one or more communication interfaces 409 for communicating with other electronic devices. The communication interface(s) 409 may be based on wired communication technology, wireless communication technology, or both. Some examples of communication interfaces 409 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 400 may also include one or more input devices 411 and one or more output devices 413. Some examples of input devices 411 include a keyboard, mouse, microphone, remote control device, button, joystick, trackball, touchpad, and lightpen. Some examples of output devices 413 include a speaker and a printer. One specific type of output device that is typically included in a computer system 400 is a display device 415. Display devices 415 used with embodiments disclosed herein may utilize any suitable image projection technology, such as liquid crystal display (LCD), light-emitting diode (LED), gas plasma, electroluminescence, or the like. A display controller 417 may also be provided, for converting data 407 stored in the memory 403 into text, graphics, and/or moving images (as appropriate) shown on the display device 415.

One or more input devices 411 may be used to provide user input that requests an identification of the number of distinct elements in a multiset. One or more output devices 413 (such as a display device 415) may be used to output an estimate of the number of distinct elements in the multiset.

The various components of the computer system 400 may be coupled together by one or more buses, which may include a power bus, a control signal bus, a status signal bus, a data bus, etc. For the sake of clarity, the various buses are illustrated in FIG. 4 as a bus system 419.

A method for optimizing memory usage for an HLL estimator is disclosed herein. The method includes creating a sparse representation of a sketch that represents information generated by applying a multiset to the HLL estimator. The sparse representation of the sketch may be sorted whenever a total number of buckets in the sparse representation is evenly divisible by a sorting threshold and is also less than a transition threshold. The sparse representation of the sketch may be converted to a dense representation of the sketch when the total number of buckets in the sparse representation reaches the transition threshold.

The sparse representation of the sketch may include a sorted portion, a header that comprises a count of the total number of buckets stored in the sparse representation, and an unsorted portion.

In some implementations, when a bucket index and a value corresponding to an element in the multiset are obtained, a determination may be made about whether the bucket index is already represented in the sparse representation of the sketch. If it is determined that the bucket index is not already represented in the sparse representation of the sketch, a new bucket may be added. The new bucket may be added to an end of the unsorted portion. The count in the header may be updated in response to adding the new bucket.

In some implementations, when a bucket index and a value corresponding to an element in the multiset are obtained, a determination may be made about whether the bucket index is outside of a range of bucket indices corresponding to the sorted portion. If it is determined that the bucket index is outside of the range of bucket indices corresponding to the sorted portion, the method may include sorting for the bucket index in the unsorted portion but not the sorted portion.

In some implementations, when a bucket index and a new value corresponding to an element in the multiset are obtained, a determination may be made that the bucket index is already represented in the sparse representation of the sketch. A determination may also be made about whether the new value is greater than an existing value that is stored in a bucket corresponding to the bucket index in the sparse representation. If it is determined that the new value is greater than the existing value, the existing value in the bucket may be replaced with the new value. If, however, it is determined that the new value is less than the existing value, the new value may be discarded without replacing the existing value in the bucket.

In some implementations, the sparse representation of the sketch may be represented in a compact format comprising contiguous memory locations. Each bucket within the sparse representation may be represented using no more than eighteen bits.

A system configured to optimize memory usage for an HLL estimator is also disclosed herein. The system includes one or more processors and memory in electronic communication with the one or more processors. Instructions may be stored in the memory. The instructions may be executable by the one or more processors to create a sparse representation of a sketch that represents information generated by applying a multiset to the HLL estimator. The instructions may also be executable to sort the sparse representation of the sketch whenever a total number of buckets in the sparse representation is evenly divisible by a sorting threshold and is also less than a transition threshold. The instructions may also be executable to convert the sparse representation of the sketch to a dense representation of the sketch when the total number of buckets in the sparse representation reaches the transition threshold.

A method for optimizing memory usage for an HLL estimator is also disclosed. The method includes sorting a sparse representation of a sketch whenever a total number of buckets in the sparse representation is evenly divisible by a sorting threshold and is also less than a transition threshold. The sparse representation may include an indication of the total number of buckets stored in the sparse representation. The sparse representation of the sketch may be converted to a dense representation of the sketch when the total number of buckets in the sparse representation reaches the transition threshold.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for optimizing memory usage for a hyperloglog (HLL) estimator, comprising:
creating a sparse representation of a sketch that represents information generated by applying a multiset to the HLL estimator, wherein the sparse representation of the sketch comprises a sorted portion and an unsorted portion;
sorting the sparse representation of the sketch whenever a total number of buckets in the sparse representation is evenly divisible by a sorting threshold and is also less than a transition threshold; and
converting the sparse representation of the sketch to a dense representation of the sketch when the total number of buckets in the sparse representation reaches the transition threshold.

2. The method of claim 1, wherein the sparse representation of the sketch comprises
a header that comprises a count of the total number of buckets stored in the sparse representation.

3. The method of claim 1, further comprising:
obtaining a bucket index and a value corresponding to an element in the multiset;
determining that the bucket index is not already represented in the sparse representation of the sketch; and
adding a new bucket to the sparse representation of the sketch.

4. The method of claim 3, wherein
adding the new bucket to the sparse representation comprises adding the new bucket to an end of the unsorted portion.

5. The method of claim 3, wherein:
the sparse representation of the sketch comprises a header;
the header comprises a count of the total number of buckets stored in the sparse representation; and
the method further comprises updating the count in response to adding the new bucket.

6. The method of claim 1, wherein the sparse representation of the sketch comprises a header that comprises a count of the total number of buckets stored in the sparse representation, the method further comprising:
obtaining a bucket index and a value corresponding to an element in the multiset;
determining, from the header, that the bucket index is outside of a range of bucket indices corresponding to the sorted portion; and
searching for the bucket index in the unsorted portion but not the sorted portion.

7. The method of claim 1, wherein each bucket within the sparse representation is represented using no more than eighteen bits.

8. The method of claim 1, further comprising:
obtaining a bucket index and a new value corresponding to an element in the multiset;
determining that the bucket index is already represented in the sparse representation of the sketch;
determining that the new value is greater than an existing value that is stored in a bucket corresponding to the bucket index in the sparse representation; and
replacing the existing value in the bucket with the new value.

9. The method of claim 1, further comprising:
obtaining a bucket index and a new value corresponding to an element in the multiset;
determining that the bucket index is already represented in the sparse representation of the sketch;
determining that the new value is less than an existing value that is stored in a bucket corresponding to the bucket index in the sparse representation; and
discarding the new value without replacing the existing value in the bucket.

10. The method of claim 1, wherein the sparse representation of the sketch is represented in a compact format comprising contiguous memory locations.

11. A system configured to optimize memory usage for a hyperloglog (HLL) estimator, comprising:
one or more processors;
memory in electronic communication with the one or more processors; and
instructions stored in the memory, the instructions being executable by the one or more processors to:
create a sparse representation of a sketch that represents information generated by applying a multiset to the HLL estimator, wherein the sparse representation of the sketch comprises a sorted portion and an unsorted portion;
sort the sparse representation of the sketch whenever a total number of buckets in the sparse representation is evenly divisible by a sorting threshold and is also less than a transition threshold; and
convert the sparse representation of the sketch to a dense representation of the sketch when the total number of buckets in the sparse representation reaches the transition threshold.

12. The system of claim 11, wherein the sparse representation of the sketch comprises
a header that comprises a count of the total number of buckets stored in the sparse representation.

13. The system of claim 11, wherein the instructions are also executable by the one or more processors to:
obtain a bucket index and a value corresponding to an element in the multiset;
determine that the bucket index is not already represented in the sparse representation of the sketch; and
add a new bucket to the sparse representation of the sketch.

14. The system of claim 13, wherein
adding the new bucket to the sparse representation comprises adding the new bucket to an end of the unsorted portion.

15. The system of claim 13, wherein:
the sparse representation of the sketch comprises a header;
the header comprises a count of the total number of buckets stored in the sparse representation; and
the instructions are also executable by the one or more processors to update the count in response to adding the new bucket.

16. The system of claim 11, wherein the sparse representation of the sketch comprises a header that comprises a count of the total number of buckets stored in the sparse representation, and wherein the instructions are also executable by the one or more processors to:
obtain a bucket index and a value corresponding to an element in the multiset;
determine, from the header, that the bucket index is outside of a range of bucket indices corresponding to the sorted portion; and search for the bucket index in the unsorted portion but not the sorted portion.

17. The system of claim 11, wherein each bucket within the sparse representation is represented using no more than eighteen bits.

18. The system of claim 11, wherein the instructions are also executable by the one or more processors to:
- obtain a bucket index and a new value corresponding to an element in the multiset;
- determine that the bucket index is already represented in the sparse representation of the sketch;
- determine that the new value is greater than an existing value that is stored in a bucket corresponding to the bucket index in the sparse representation; and
- replace the existing value in the bucket with the new value.

19. The system of claim 11, wherein the instructions are also executable by the one or more processors to:
- obtain a bucket index and a new value corresponding to an element in the multiset;
- determine that the bucket index is already represented in the sparse representation of the sketch;
- determine that the new value is less than an existing value that is stored in a bucket corresponding to the bucket index in the sparse representation; and
- discard the new value without replacing the existing value in the bucket.

20. A method for optimizing memory usage for a hyperloglog (HLL) estimator, comprising:
- sorting a sparse representation of a sketch whenever a total number of buckets in the sparse representation is evenly divisible by a sorting threshold and is also less than a transition threshold, wherein the sparse representation comprises a sorted portion, an unsorted portion, and an indication of the total number of buckets stored in the sparse representation; and
- converting the sparse representation of the sketch to a dense representation of the sketch when the total number of buckets in the sparse representation reaches the transition threshold.

* * * * *